United States Patent
Wurziger et al.

(10) Patent No.: US 6,632,043 B1
(45) Date of Patent: Oct. 14, 2003

(54) CONNECTION COUPLING FOR PLATE-SHAPED MICROCOMPONENTS

(75) Inventors: Hanns Wurziger, Darmstadt (DE); Michael Schmelz, Griesheim (DE); Norbert Schwesinger, Ilmenau (DE)

(73) Assignee: Merck Patent Gesellschaftmit Beschrankter Haftung, Darmstadt (DE)

(*) Notice: Subject to any disclaimer, the term of this patent is extended or adjusted under 35 U.S.C. 154(b) by 0 days.

(21) Appl. No.: 09/868,942

(22) PCT Filed: Dec. 14, 1999

(86) PCT No.: PCT/EP99/09918
§ 371 (c)(1), (2), (4) Date: Jun. 21, 2001

(87) PCT Pub. No.: WO00/39469
PCT Pub. Date: Jul. 6, 2000

(30) Foreign Application Priority Data
Dec. 24, 1998 (DE) .......... 198 60 220

(51) Int. Cl.⁷ .............. F16L 41/14
(52) U.S. Cl. .......... 403/373; 403/34; 403/299; 285/188; 137/68.14
(58) Field of Search .......... 403/13, 14, 318, 403/319, 388, 373, 34, 36, 343, 299, 353; 285/188, 189, 219, 205, 206; 137/68.14, 15.09, 15.17, 15.24; 251/81; 62/50.7

(56) References Cited

U.S. PATENT DOCUMENTS

| | | | | |
|---|---|---|---|---|
| 1,946,619 A | * | 2/1934 | Furman et al. | |
| 4,118,280 A | | 10/1978 | Charles | |
| 4,157,195 A | | 6/1979 | Costanzo | |
| 5,046,762 A | * | 9/1991 | Konishi | 285/206 X |
| 5,349,979 A | | 9/1994 | Zeien | |
| 5,482,329 A | * | 1/1996 | McCall et al. | 285/206 X |
| 5,519,635 A | | 5/1996 | Miyake | |
| 5,593,279 A | * | 1/1997 | Hayashi | 285/205 |

FOREIGN PATENT DOCUMENTS

EP    0 040 186    11/1981

* cited by examiner

Primary Examiner—Lynne H. Browne
Assistant Examiner—John R. Cottingham
(74) Attorney, Agent, or Firm—Millen, White, Zelano & Branigan, P.C.

(57) ABSTRACT

A connection coupling forms a line connection for liquid or gaseous substances to microcomponents (1) in platelet form. A coupling body (2), which is substantially U-shaped in cross section, accommodates the edge of the plate-like microcomponent (1) between an upper limb plate (3), which has the line connection (14), and a lower limb plate (5). An edge web (6) forms a transverse stop for an edge (8) of the microcomponent (1). A further stop means, for example a lug (9), forms a longitudinal stop for positioning of the microcomponents (1).

10 Claims, 4 Drawing Sheets

CONNECTION COUPLING FOR PLATE-SHAPED MICROCOMPONENTS

Figure 1:
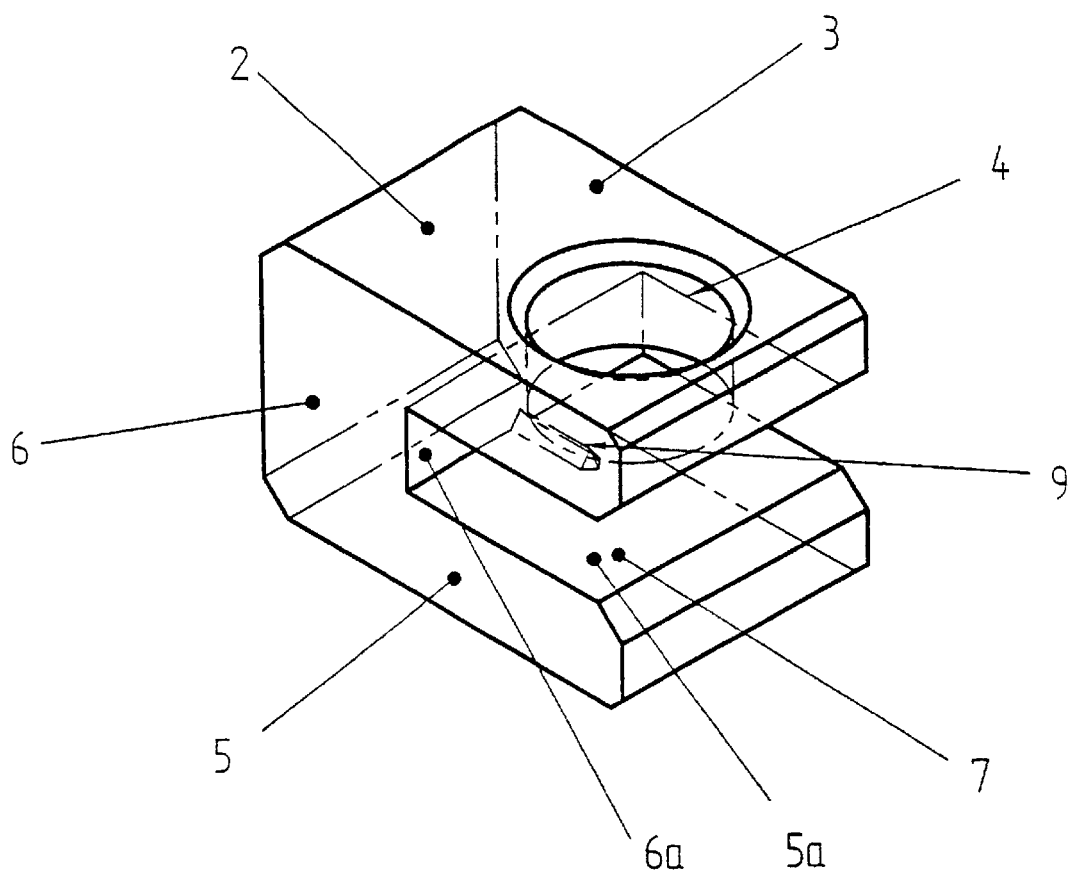

The invention relates to a connection coupling for microcomponents in plate form, having at least one line connection for liquid or gaseous substances.

Plate-like microcomponents, such as micromixers, micropumps, microvalves or the like, are used to carry out chemical reactions with extremely low mass flows. The use of microcomponents allows precise temperature control and thorough mixing, so that significantly more accurate process control becomes possible in combination with increased reliability.

The microcomponents usually comprise a plurality of plane-parallel plates which rest on top of one another and, in their surfaces which rest on one another, contain the structures required for the necessary function. On account of the good thermal conductivity and ease of structuring, these plates usually consist of silicon (silicon wafers), which in the interior contain a geometry which is adapted to the particular function of the microcomponent. In addition, however, it is also possible to use other chemically resistant materials which are appropriate for the conditions of use.

Owing to the limited mechanical strength of silicon, it is necessary as far as possible to avoid tensile and flexural loads on the plate-like microcomponent. However, fitting the line connections for the supply and removal of the liquid or gaseous substances which are to be mixed or conveyed presents difficulties. On the one hand, it is necessary to ensure accurate positioning with respect to the line holes emerging from the plate surface; on the other hand, there is a risk that when the line connections are being fitted or when the microcomponent is being installed or dismantled, unacceptable flexural loads will be introduced via these line connections.

Therefore, it is an object of the invention to provide a connection coupling of the generic type described in the introduction which makes it possible, in a structurally simple manner, to produce a line connection without, in the process, introducing significant flexural stresses into the plate-like microcomponent.

According to the invention, this object is achieved by the fact that a coupling body, which is substantially U-shaped in cross section, in an upper limb plate has a threaded bore which accommodates the line connection, in that an edge web connects the upper limb plate to a lower limb plate which is arranged parallel to and at a distance from the upper limb plate, and in that stop means are provided for positioning the plate-like microcomponent, which can be accommodated between the upper limb plate and the lower limb plate.

The U-shaped coupling body engages around the edge of the plate-like microcomponent which is to be connected. As a result of the line connection being screwed into the threaded bore, the line connection is pressed onto the line bore in the surface of the microcomponent. As a result, a secure and tight connection of the line connection to the microcomponent is achieved. The accurate positioning required is effected by the stop means provided on the connection coupling.

According to a preferred embodiment of the invention, the inner surface of the edge web forms a transverse stop for one edge of the plate-like microcomponent, and at least one further stop means is provided as a longitudinal stop.

The plate-like microcomponent which is to be centered with respect to the connection coupling is in this case fixed in one direction (referred to as the "transverse" direction in this context) by the fact that its edge bears against the edge web of the coupling body. It is fixed in the other direction, which runs at right angles to the first direction (and in this context is referred to as the "longitudinal" direction) by means of an additional longitudinal stop. This ensures reliable and unambiguous positioning of the microcomponent in both directions of its plate plane relative to the connection coupling.

An end wall, which extends at right angles to the edge web, of the coupling body preferably forms the longitudinal stop for one edge of the plate-like microcomponent.

It is particularly advantageous if the end wall forms a force-transmitting connection between the upper limb plate and the lower limb plate. In this case, together with the edge web connecting the two limb plates, a particularly dimensionally rigid connection between the two limb plates is achieved, so that the force exerted on the held microcomponent when the line connection is screwed in leads to only slight bending of the coupling body.

A further advantageous configuration of the inventive idea consists in the fact that a lug, peg or the like, which projects out of the lower limb plate and/or the edge web, can be brought into engagement with a corresponding recess in the plate-like microcomponent and forms the longitudinal stop.

Figure 2:
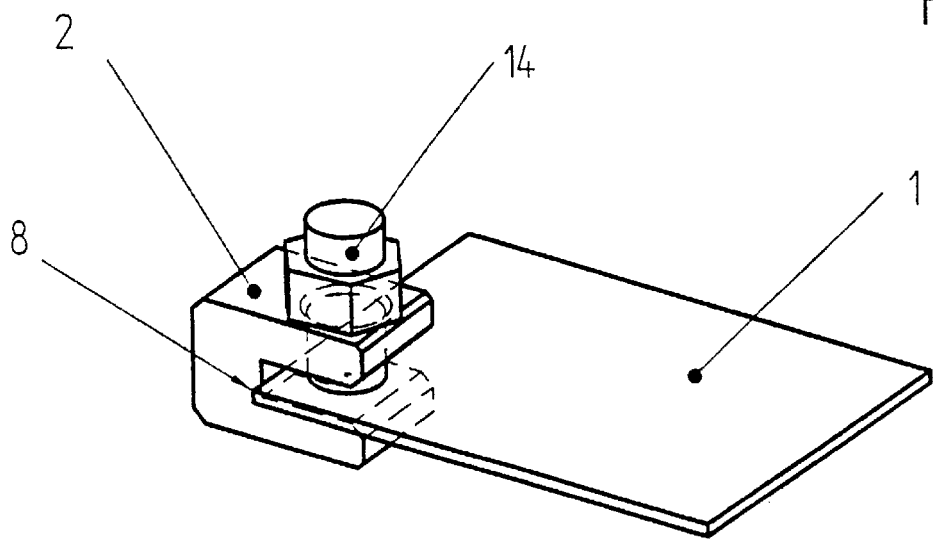
Figure 3:
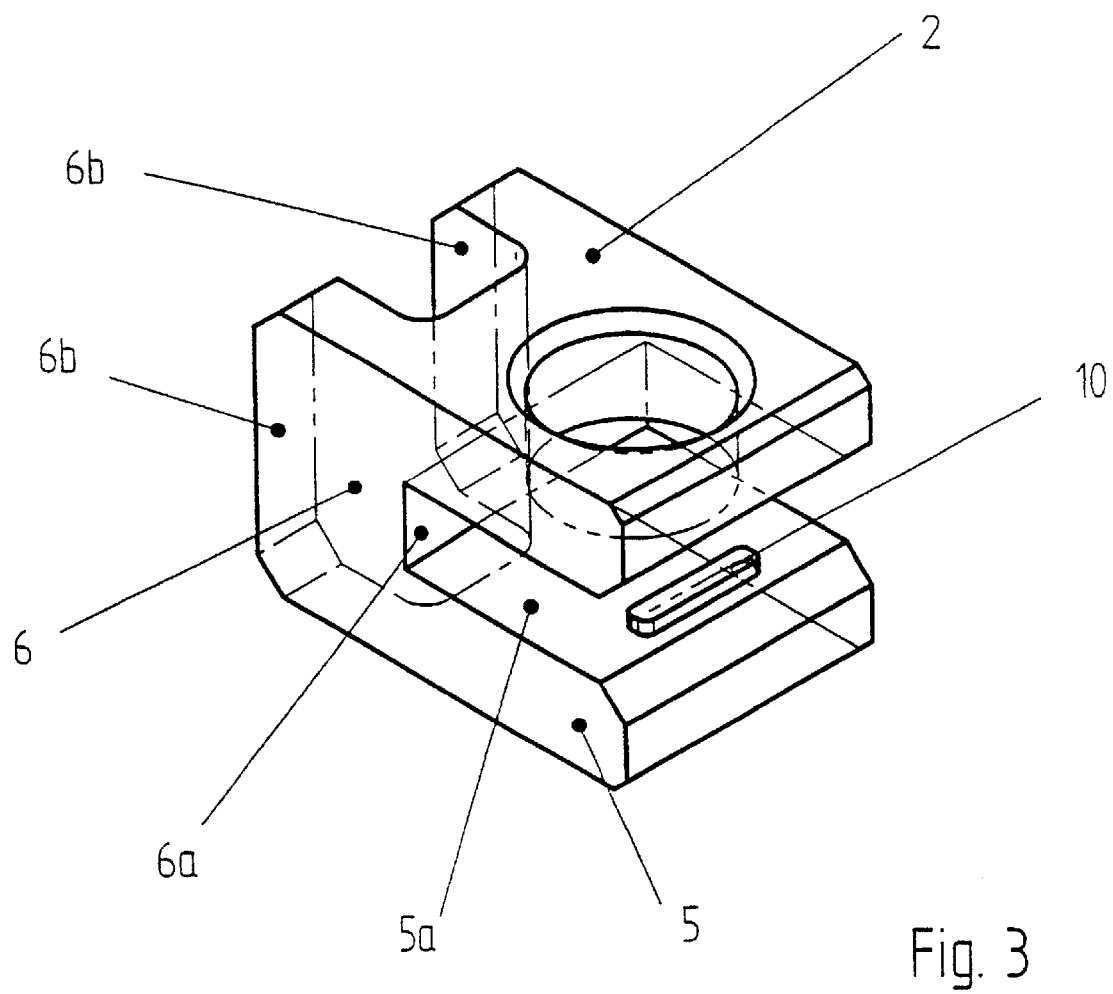
Figure 4:
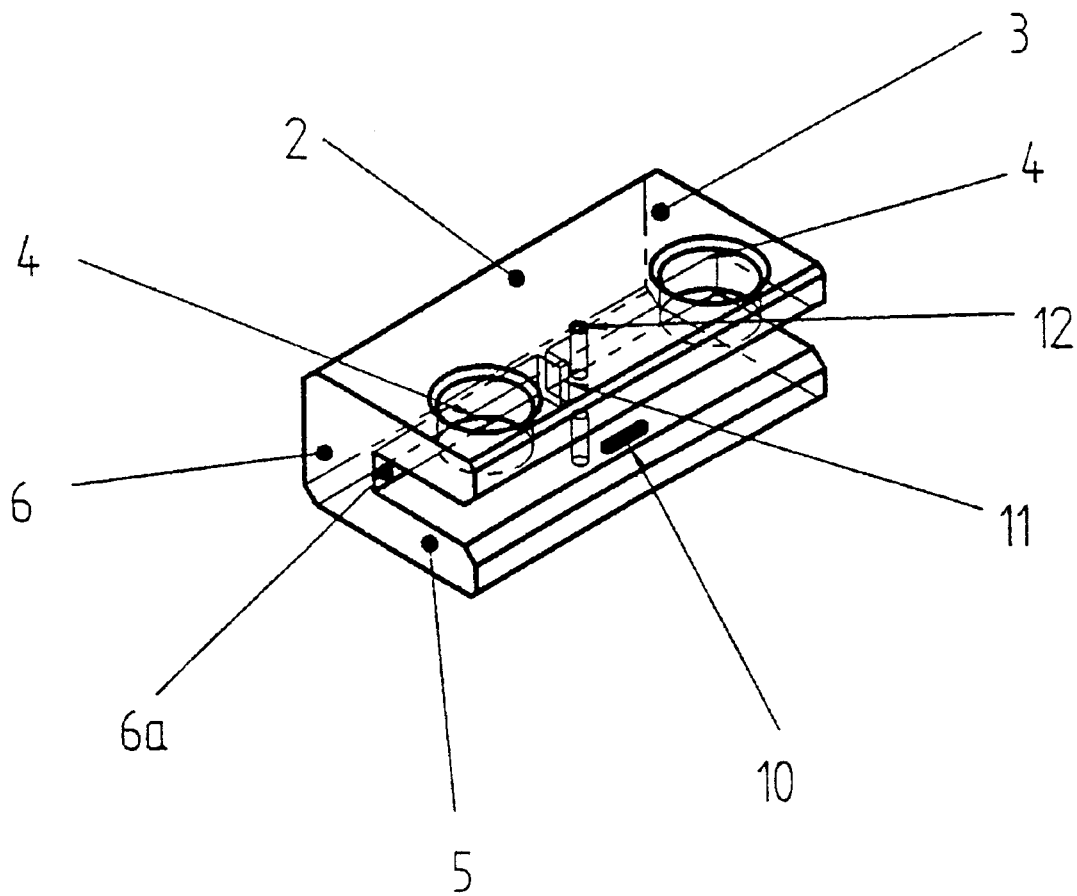
Figure 5:
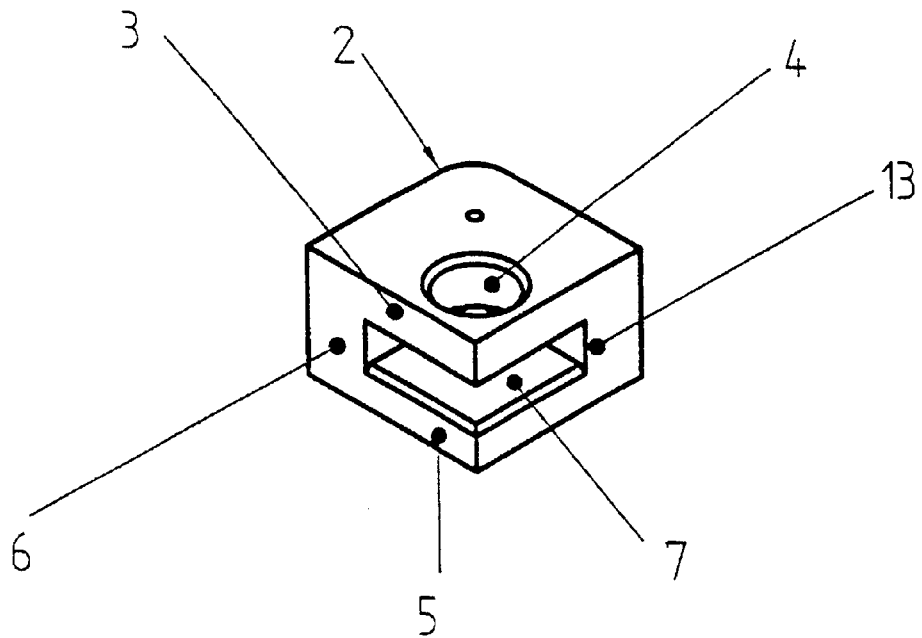
Figure 6:
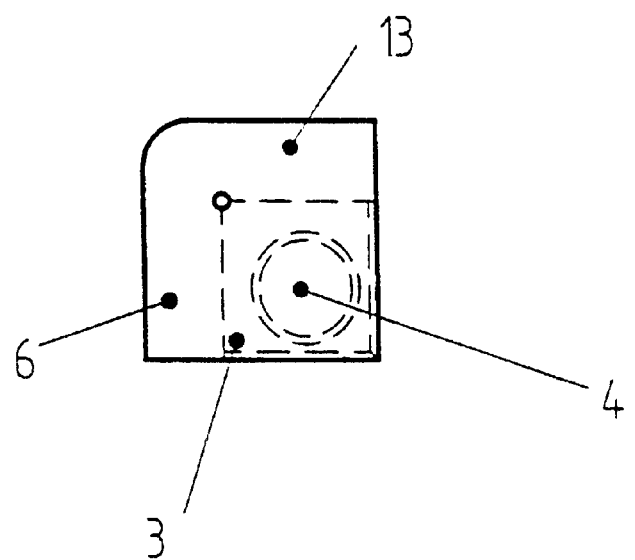

Exemplary embodiments of the invention are explained in more detail below and are illustrated in the drawing, in which:

FIG. 1 shows a three-dimensional illustration of a connection coupling for microcomponents in plate form, FIG. 2 shows a three-dimensional illustration of the assembly with a microcomponent in platelet form, FIG. 3 shows a modified embodiment of the connection coupling shown in FIG. 1, FIG. 4 shows a further modified embodiment of the connection coupling with two line connections, FIG. 5 an embodiment of a connection coupling with in each case one end wall as longitudinal stop and one end wall as transverse stop, FIG. 6 shows a plan view of the connection coupling shown in FIG. 4.

The connection coupling illustrated in FIG. 1 is used to bring a line connection (14), which is provided with an external thread, into sealed connection with a connection bore in a microcomponent 1 in platelet form. A coupling body 2, which is substantially U-shaped in cross section and is preferably produced as a single piece of metal or plastic, has an upper limb plate 3, in which a threaded bore 4 extends transversely to the plate plane of the microcomponents 1. The line connection (14), which is provided with an external screw thread, is screwed into the threaded bore 4, in order to press its line opening onto the connection bore in the surface of the platelet-like microcomponent 1.

At one edge, the upper limb plate 3 is connected in a flexurally rigid manner, via an edge web 6, to a lower limb plate 5, which is arranged parallel to and at a distance from the upper limb plate. The microcomponent 1 which is to be connected is accommodated in the space 7 between the upper limb plate 3 and the lower limb plate 5 in such a way that one of its edges 8 bears against the inner, face 6a of the edge web 6. This inner face 6a thus forms a transverse stop for the microcomponent 1.

At right angles to this, i.e. in the longitudinal direction, in the exemplary embodiment illustrated in FIG. 1 the microcomponent 1 is centered by a lug 9 or strip which projects out of the upper side 5a of the lower limb plate 5 and engages with a corresponding recess on the underside of the plate-like microcomponent. The microcomponent 1 is thus fixed in the longitudinal direction and the transverse direction with respect to the connection body 2, thus ensuring accurate positioning of the line connection with respect to the associated connection bore in the microcomponent 1. As an alternative to the exemplary embodiment illustrated, a lug or other projection may be provided on the inner face 6a of the edge web 6 instead of or in addition to the lug 9 illustrated, in order to engage with a correspondingly shaped edge notch of the plate-like microcomponent.

The exemplary embodiment illustrated in FIG. 3 differs from the exemplary embodiment illustrated in FIG. 1 substantially in that an elongate peg 10 projects out of the upper side 5a of the lower limb plate 5, which peg engages in a corresponding recess, which is produced, for example, by etching, on the lower side of the plate-like microcomponent 1 and forms the longitudinal stop for the microcomponent 1. The peg 10 may at the same time also form the transverse stop. Instead, or in addition, however, in this case too the inner side 6a of the edge web 6 may form the transverse stop, in the manner which has already been described. In addition, the engagement of the peg 10 on the microcomponent 1 ensures that, during the screwing operation, there is no unintentional change in position between the edge 8 and the inner side 6a.

Moreover, FIG. 3 shows that, to avoid undesirable bending of the U-shaped coupling body 2, reinforcing ribs 6b may be provided on the outer side, which is remote from the inner side 6a, of the edge web 6.

The example illustrated in FIG. 4 shows that, by way of example, two threaded bores 4 may also be provided in the upper limb plate 3 of the coupling body 2, in order to fit two line connections. As alternatives for the longitudinal stop, in FIG. 3 a plate-like insert part 11 is illustrated in the region of the inner side 6a of the edge web 6, or an inserted pin 12 is illustrated.

In the exemplary embodiment shown in FIGS. 5 and 6, the coupling body 2, which is substantially U-shaped in cross section, in addition to its edge web 6 has an end wall 13 which runs at right angles thereto and which, like the edge web 6, forms a force-transmitting connection between the upper limb plate 3 and the lower limb plate 5. This significantly reduces the risk of the coupling body 2 bending under the action of the screwing force of the line connections, and the position of the platelet-like microcomponents is unambiguously fixed by means of the corner which is formed. This makes it possible to apply a relatively high clamping force for the purpose of fixing the connection coupling to the plate-like microcomponent 1 without, as a result, causing unacceptable deformation of the connection coupling.

What is claimed is:

1. Connection coupling microcomponents in plate form, having at least one line connection for liquid or gaseous substances, characterized in that a coupling body (2), which is substantially U-shaped, in an upper limb plate (3) has a threaded bore (4), which accommodates the line connection (14), in that an edge web (6) connects the upper limb plate (3) in a flexurally rigid manner to a lower limb plate (5) which is arranged parallel to and at a distance from the upper limb plate so as to form a U-shaped body, and in that stop means are provided by a surface (6a) on the edge web (6) for the purpose of positioning a plate microcomponent (1), which can be accommodated between the upper limb plate (3) and the lower limb plate (5).

2. Connection coupling according to claim 1, characterized in that the inner face (6a) of the edge web (6) forms a transverse stop of the stop means for a first edge (8) of the plate microcomponent (1), and in that at least one further stop means (7–13) is provided as a longitudinal stop.

3. Connection coupling according to claim 2, characterized in that an end wall (13), which extends perpendicular to the edge web (6), of the coupling body (2) forms a longitudinal stop for a second edge of the plate microcomponent, the second edge extensions perpendicular to the first edge.

4. Connection coupling according to claim 3, characterized in that the end wall (13) forms a force-transmitting connection between the upper limb plate (3) and the lower limb plate (5).

5. Connection coupling according to claim 2, characterized in that a lug (9) or a peg (10) which projects out of the lower limb plate (5) or the edge web (6), can be brought into engagement with a corresponding recess in the plate microcomponent (1) and forms the longitudinal stop.

6. A connection coupling a tube conveying fluids through a line hole in a plate microcomponent adjacent to an edge of the plate microcomponent, the connection coupling comprising:

a U-shaped body defined by a pair of limbs connected at one end to one another by an edge engaging wall, wherein the plate microcomponent fits between the two limbs with an edge of the plate microcomponent in abutment with the edge engaging wall, and a threaded bore through one of the limbs for receiving a threaded end of a tube coupling, the threaded bore being in alignment with a line hole in the plate microcomponent.

7. The connection coupling of claim 6, wherein the plate microcomponent is made of silicon.

8. The connection coupling of claim 6, wherein the plate microcomponent has a corner, the corner being defined by two edges which extend perpendicularly with respect to one another, and wherein the edge engaging wall or the U-shaped body has perpendicularly extending surfaces complementing the two edges of the plate microcomponent for engaging the two edges of the plate microcomponent defining the corner.

9. The connection coupling of claim 6, further comprising an additional threaded bore through one of the limbs.

10. The connection coupling of claim 6, further comprising an element for engaging the plate microcomponent to prevent lateral movement of the plate microcomponent with respect to the connection coupling.

* * * * *

UNITED STATES PATENT AND TRADEMARK OFFICE
CERTIFICATE OF CORRECTION

PATENT NO.    : 6,632,043 B1
DATED         : October 14, 2003
INVENTOR(S)   : Wurziger et al.

It is certified that error appears in the above-identified patent and that said Letters Patent is hereby corrected as shown below:

<u>Title page,</u>
Item [73], Assignee, change "Merck Patent Gesellschaftmit" to -- Merck Patent Gesellschaft mit --.

<u>Column 3,</u>
Line 53, insert -- A -- before "Connection".

<u>Column 4,</u>
Line 27, after "coupling", insert -- coupling --.

Signed and Sealed this

Fourth Day of January, 2005

JON W. DUDAS
*Director of the United States Patent and Trademark Office*